United States Patent [19]
Vollenberg et al.

[11] Patent Number: 6,127,475
[45] Date of Patent: Oct. 3, 2000

[54] COMPOSITION FOR LASER MARKING

[75] Inventors: Peter H. Th. Vollenberg, Evansville; Robert A. Fisher, Wadesville, both of Ind.

[73] Assignee: General Electric Company, Schenectady, N.Y.

[21] Appl. No.: 09/160,901

[22] Filed: Sep. 25, 1998

[51] Int. Cl.[7] .................................................. C08K 3/03
[52] U.S. Cl. ........................ 524/495; 524/494; 524/496
[58] Field of Search ................................... 524/494, 495, 524/496

[56] References Cited

U.S. PATENT DOCUMENTS

| | | |
|---|---|---|
| 2,465,319 | 3/1949 | Winfield et al. . |
| 2,720,502 | 10/1955 | Caldwell . |
| 2,727,881 | 12/1955 | Caldwell et al. . |
| 2,822,348 | 2/1958 | Haslam . |
| 3,047,539 | 7/1962 | Pengilly . |
| 3,671,487 | 6/1972 | Abolins . |
| 3,953,394 | 4/1976 | Fox et al. . |
| 4,128,526 | 12/1978 | Borman . |
| 4,595,647 | 6/1986 | Spanjer . |
| 4,636,544 | 1/1987 | Hepp . |
| 5,373,039 | 12/1994 | Sakai et al. ............................. 524/100 |
| 5,589,530 | 12/1996 | Walsh . |

FOREIGN PATENT DOCUMENTS

| | | |
|---|---|---|
| 0-111-357 | 6/1990 | European Pat. Off. . |
| 0-675 001 | 3/1994 | European Pat. Off. . |
| 0-669-365 | 2/1995 | European Pat. Off. . |
| 0 753 536 | 1/1997 | European Pat. Off. . |
| 2 107 322 | 9/1981 | United Kingdom . |

OTHER PUBLICATIONS

T. Kilp, Laser Marking of Plastics', Annu Tech. Conf. Soc. Plast. Eng., (1991), 49th, 1901–1903.

Pigment Blacks for Printing Inks, Coatings and Plastics by Defussa.

DE 42 35 302 A & abstract Apr. 21, 1994 Germany.

XP–0021222331 abstract Aug. 8, 1994 Japan.

*Primary Examiner*—Edward J. Cain

[57] ABSTRACT

A resin composition with laser marking properties comprises a polyester thermoplastic resin, a sufficient amount of channel black carbon pigment for forming a dark background coloration wherein said channel black carbon pigment decomposes in laser struck areas whereby light colored markings are obtained on the dark background.

13 Claims, No Drawings

COMPOSITION FOR LASER MARKING

FIELD OF THE INVENTION

This invention relates to a resin composition suitable for marking with a laser and a method for laser marking.

BACKGROUND OF THE INVENTION

The laser beam provides a means of writing, bar coding and decorative marking of plastics. This technique is advantageous over current printing technologies because of the ease at which the layout can be adjusted using graphic computer programs and also integrated into the production line. Laser marking enables a contract-free procedure even on soft, irregular surfaces that are not readily accessible. In addition it is ink-free which makes it long-lasting and solvent-free and, thus, more friendly to the environment. Speeds up to 10,000 mm/sec are possible with a $CO_2$ laser while Nd-YAG laser allows up to 2000 mm/sec. Two-color injection molding offers marking results with the best contrast but the method is not flexible to change of layout. Thus, laser marking offers a versatile solution to most printing needs.

There are several laser types available for marking plastic surfaces. The Excimer laser with the frequency in the range of 196–351 nm leads to the marking of plastic surfaces by photochemical ablation or reaction. The Nd-YAG laser at lower power levels at 532 nm marks by leaching or selective bleaching of dyes and pigments. The YAG laser at 1064 nm marks by sublimation, discoloration, foaming or engraving. The $CO_2$ laser at 10600 nm marks by thermochemical reaction, melting, vaporizing and engraving.

With carbon black as an ingredient, the laser creates lightly colored areas in contrast to a dark background. Carbon black decomposes into volatile components after absorbing the laser light. These volatile components foam the surface to scatter light and leave a lightly colored impression.

Contrast enhancing agents are descried in the prior art. EP 0 675 001 to Kato describes the use of zinc borate as a contrast enhancing additive where water of hydration is released. U.S. Pat. No. 4,595,647 to Spanjer describes a laser markable material useful for encapsulation of electronic devices. The material includes $TiO_2$ or $TiO_2+CrO_3$ as an additive to common plastic encapsulants which are formed from a mixture of resin, filler, carbon black, and mold release agent. When irradiated by a $CO_2$ laser, the originally grey material forms a bright gold high contrast and durable mark. Desirable concentrations are described, in weight percent of the compound, as 1–5% $TiO_2$ and 0–3% $CrO_3$, with 1–3% $TiO_2$ and 0.5–2% $CrO_3$ being preferred. Carbon black is described as optional but a concentration in the range 0.1–3% by weight is desirable with 0.5–1% preferred.

GB 2,107,322 describes marking polymers which have low absorption in the infra-red range of wavelengths using a CO2 laser beam. The silicate additive having a high absorption at the wavelength 10.6 $\mu$ is calcium silicate, which in the form of wollastonite has an absorption of 96% at a wavelength of 10.6 $\mu$. Other silicates described include aluminum silicates, e.g. in the form of China clay. The resin material described refer to polyolefins, polystyrene, and acrylonitrile-butadiene-styrene type materials.

Other references to silicates are found in EP 0 669 365 which describes the addition of silicates to polyolefins to yield a dark brown or black marking in the laser struck areas. Similarly, EP 0 111 357 uses metal silicates to obtain black markings on articles having a polyolefin surface. T. Kilp, "Laser marking of Plastics", Annu. Tech. Conf. Soc. Plast. Eng., (1991), 49th, 1901–1903, describes the effects of different silicates on the laser marking of polyolefins. Kaolin gave white marks on colored substrates while black marks were obtained when mica or titanium dioxide were incorporated into the substrate.

It is desirable to make further improvements in laser marking materials of the polyester type. In particular, a desired color combination is a dark background color and a light contrast color in the laser treated areas.

SUMMARY OF THE INVENTION

A desirable improvement is to provide polyester resin compositions containing ingredients selected to enhance the laser marking of resins so dark background coloration can be achieved with distinct and secure light colored markings in the laser treated areas.

According to the present invention, a resin composition having laser marking properties comprises a polyester thermoplastic resin, a sufficient amount of channel black carbon for forming a dark background coloration, wherein said channel black carbon may decompose in laser struck areas to form a marking in laser struck areas. The resin composition may include a light colorant to contrast the light colored markings in laser struck areas to the dark background coloration. The improved laser marking properties are particularly evident with the $CO_2$ laser with radiation at 10600 nm.

DETAILED DESCRIPTION OF THE PREFERRED EMBODIMENTS

According to the principles of the present invention, there is provided an effective amount channel black as a background coloration wherein the channel black colored blend shows light colored markings in areas struck by laser light giving contrast with the dark background coloration.

According to the process for making channel black, the gaseous raw material is burned by direct combustion in a large number of small luminous flames which impinge on cooled surfaces. The resulting carbon black is collected as channel black. The gaseous raw material may be methane, natural gas, or other gaseous or vaporized hydrocarbon.

According to a preferred process, known as the Degussa gas black process, vaporized oil as feed stock is burned, carbon is collected on cooled rollers, and then removed to form the channel black. The high temperature boiling oil is heated, vaporized at about 350 degrees Centigrade, and conveyed to the burners by a combustible carrier gas. Processing according to this technique is set forth in the publication Pigment Blacks for Printing Inks, Coatings and Plastics by Degussa. The resulting carbon black, known as channel black, has a preferable particle size from about 10 to about 30 nm. The morphology of the channel black is of very fine non-agglomerated particles.

Channel black is utilized in a amount from about 0.01 to about 5 percent, preferably from about 0.03 to about 3 percent by weight based on the total weight of the composition. A preferred low range is from about 0.05 to about 1.5 percent by weight.

Preferably, the resin contains a sufficient amount of lightly colored pigment for forming a light coloration. This pigmentation can be in the form of various pigments and dyes such as set forth in the examples that are compatible with the resin. Pigments are generally present in an amount from 0.01 to 4 percent by weight. A suitable white pigment is Sachtolith HDS from Sachtleben Chemie J. G.

Polyesters include those comprising structural units of the following formula:

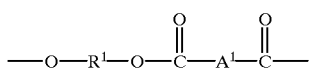

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

Examples of aromatic dicarboxylic acids represented by the dicarboxylated residue Al are isophthalic or terephthalic acid, 1,2-di(p-carboxyphenyl)ethane, 4,4'-dicarboxydiphenyl ether, 4,4'bisbenzoic acid and mixtures thereof. Acids containing fused rings can also be present, such as in 1,4-1,5- or 2,6- naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The polyesters used herein have an intrinsic viscosity of from about 0.4 to about 2.0 dl/gas measured in a 60:40 phenol/tetrachloroethane mixture or similar solvent at 23°–30° C. VALOX Registered TM 315 and 195 polyesters are particularly suitable for this invention. Preferably intrinsic viscosity is about 1.1 to about 1.4 dl/g.

Blends of polyesters may also be employed in the composition. As indicated earlier, preferred polyesters are poly (ethylene terephthalate) and poly(1,4-butylene terephthalate). When blends of these preferred components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

Also, blends of relatively low molecular weight polybutylene terephthalate resin may be used with a blend of relatively high molecular weight polybutylene therephthalate. As set forth in U.S. Pat. No. 5,589,530 to Walsh, the low molecualar weight polybutlene terephthalate is a PBT resin having a melt viscosity of less than 600 poise, more preferably less than about 450 poise, and most preferably less than about 300 poise. VALOX® 195 resin having a melt viscosity of about 300 poise is available from General Electric Company. The high molecular weight polyester resins typically hae a melt viscosity above aout 600 poise, more perferably above about 900 poise, and most preferably above about 1100 poise. Preferred as the high molecular weight polyester resins are high molecular weight polybutylene terephthalae, polyethylene terephthalate and polycyclohexane dimethylene terephthatlate. A particularly suitable high molecular weight PBT, which is sold commercially is VALOX® 295 (melt viscosity of about 1110 poise) or is VALOX® 315 (melt viscosity of about 8500 poise), both available from General Electric Company.

From the above description, it is apparent that, according to the present invention, compositions which contain channel black carbon form more distinct marks by means of laser light irradiation than in the case of compositions containing just one or neither of these.

Additionally, the preferred resin compositions of the present invention include reinforcing glass fibers. The fibrous glass comprises from 5 to 40 weight percent, preferably from about 10 to about 30 percent by weight based on the total weight. The glass fiber or filamentous glass is desirable employed as reinforcement in the present compositions. Glass that is relatively soda free is preferred. The low soda glass known as "C" glass may be utilized. For electrical uses, fibrous glass filaments comprised of lime-aluminum borosilicate glass that is relatively soda-free which is known as "E" glass may be used. The filaments are made by standard processes, e.g., by steam or air blowing, flame blowing and mechanical pulling. The preferred filaments for plastic reinforcement are made by mechanical pulling. The filament diameters range from about 3 to 30 microns inch but this is not critical to the present invention.

In preparing the molding compositions it is convenient to use the filamentous glass in the form of chopped strands of from about ⅛" to about ½" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

As an additional ingredient, a flame-retardant additive may be present in an amount at least sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularily inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Other ingredients employed in low amounts, typically less than 5 percent by weight of the total composition, include stabilizers, lubricants, colorants, plasticizers, nucleants, antioxidants and UV absorbers. These ingredients should be selected so as not to deleteriously affect the desired properties of the molded resin.

Although it is not essential, best results are obtained if the ingredients are precompounded, pelletized and then molded. Precompounding can be carried out in conventional equipment. For example, after predrying the polyester resin, other ingredients, and, optionally, other additives and/or reinforcements, a single screw extruder is fed with a dry blend of the composition. On the other hand, a twin screw extrusion machine can be fed with resins and additives at the feed port and reinforcement down stream.

Portions of the blend can be precompounded and then, extruded with the remainder of the formulation, and cut or chopped into molding compounds, such as conventional granules, pellets, etc. by standard techniques.

Distinct and secure marking can be carried out on the resin compositions of the present invention by means of laser irradiation.

EXAMPLES

The formulations shown below were preblended and extruded. The extrudate was cooled through a water bath and then pelletized. The resin pellets were dried in a forced air circulating oven prior to injection molding. Test parts were then injection molded.

The formulation of Examples 1 to 2 are examples of the invention. Examples A to C are comparative examples. The samples of each example are tested with a CO2 type laser which at 1064 nm. The polyester used was Valox® polyester resin grade 325M-1001, natural 325M available from General Electric Company. No color pigments were added so that a good comparison could be obtained without interference from pigments. DE is the color difference between laser marked and non-laser marked part according to the CieLab method, DIN 6174, source. Contrast ratio (CR) is calculated by dividing the Y value of the background color by the Y value of the laser Y is measured according to Cielab Method, DIN 6174, source D65.

The basic composition chosen for the study was Valox 325M. Based on this formulation, 5 compositions were made containing different types of carbon black. In all formulations the amount of carbon black was maintained at the same level of 0.1 wt %. Table 1 shows an overview of these formulations. All samples were formulated and molded into rectangular plaques of about 2" by 3".

TABLE 1

Formulation of test samples

| component | Example 1 | Example 2 | Example A | Example B | Example C |
| --- | --- | --- | --- | --- | --- |
| PBT 195 | 57.90 wt % | 57.90 wt % | 57.90 wt % | 57.90 wt % | 57.90 wt % |
| PBT 315 | 41.75 wt % | 41.75 wt % | 41.75 wt % | 41.75 wt % | 41.75 wt % |
| Irganox 1076 | 0.15 wt % | 0.15 wt % | 0.15 wt % | 0.15 wt % | 0.15 wt % |
| Comboloob 0609 | 0.10 wt % | 0.10 wt % | 0.10 wt % | 0.10 wt % | 0.10 wt % |
| Degussa S160 | 0.10 wt % | | | | |
| Degussa FW200 | | 0.10 wt % | | | |
| Raven 2500 | | | 0.10 wt % | | |
| Vulcan 9A32 | | | | 0.10 wt % | |
| Monarch 800 | | | | | 0.10 wt % |

PBT 195 (Valox ® resin grade 195, General Electric Company
PBT 315 (Valox ® resin grade 195, General Electric Company
Antioxidant Irganox 1076 (CIBA)

Lasermarking was performed. Actual color measurements were performed on the lasermarked plaques at and the results are summarized in Table 2. The color measurements were performed with a spectrophotometer using the following conditions and settings: CIELAB, 100° degree observer, D65, specular included. The measurements were performed against a white tile standard. For that reason, a higher DE* result indicates that the color of the sample resembles the white tile standard to a lower degree.

As appears from Table 2, surprisingly, the channel black samples outperformed the furnace black samples significantly. The furnace black based samples show very little variation in the test results. Carbon black based on the furnace technology is presently the standard material of choice in the industry. For this reason, the furnace black samples are to be seen as the reference samples.

TABLE 2

Sample test results

| test sample | carbon black process | carbon black particle size | carbon black surface area | DE* measured on mark |
|---|---|---|---|---|
| Example 1 | channel | 20 nm | 150 | 12.8 |
| Example 2 | channel | 13 nm | 460 | 14.4 |
| Example A | furnace | 17 nm | 210 | 15.9 |
| Example B | furnace | 19 nm | 140 | 16.0 |
| Example C | furnace | 13 nm | 270 | 16.1 |

Within the channel black based samples, the material based on a larger particle size carbon black, and therefore with the smaller surface area, appeared to result in the laser mark being the closest in color to the white tile standard.

What is claimed is:

1. A resin composition having laser marking properties consisting essentially of a polyester thermoplastic resin, a sufficient amount of channel black carbon pigment for forming a dark background coloration whereby light colored markings are obtained on said dark background coloration in areas struck by laser light.

2. A resin composition having laser marking properties according to claim 1 wherein said channel black is present in a amount from about 0.01 to about 5 percent.

3. A resin composition having laser marking properties according to claim 2 herein said channel black is present in a amount from about 0.03 to about 3 percent.

4. A resin composition having laser marking properties according to claim 1 wherein said channel black has a fine non-aggomerated particles wherein a particle size from about 10 to about 30 nm.

5. A resin composition having laser marking properties according to claim 1 wherein said channel black is prepared by impinging combusted hydrocarbon gas on cooled surface.

6. A resin composition having laser marking properties according to claim 1 wherein said composition comprises a sufficient amount of light pigment for forming a light coloration in said laser struck areas.

7. A resin composition having laser marking properties according to claim 1 wherein said polyester composition comprises structural units of the following formula:

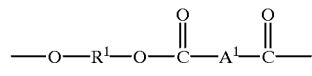

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

8. A resin composition having laser marking properties according to claim 1 additionally including reinforcing glass fibers.

9. A resin composition having laser marking properties according to claim 8 wherein said glass fibers comprise from 5 to 40 weight percent.

10. A molder article having laser radiated marked surface portions, said article comprises a polyester thermoplastic resin, a sufficient amount of channel black carbon pigment for forming a dark background coloration whereby light colored markings are obtained on said dark background in areas struck by laser light.

11. A resin composition having laser marking properties according to claim 10 wherein said polyester composition comprises structural units of the following formula:

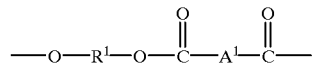

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

12. A resin composition having laser marking properties according to claim 11 additionally including reinforcing glass fibers.

13. A resin composition having laser marking properties according to claim 12 wherein said fibrous glass comprises from 5 to 40 weight percent.

* * * * *